Nov. 6, 1923.  
J. P. SEAHOLM  
VEHICLE WHEEL  
Filed Aug. 13, 1921  
1,472,856
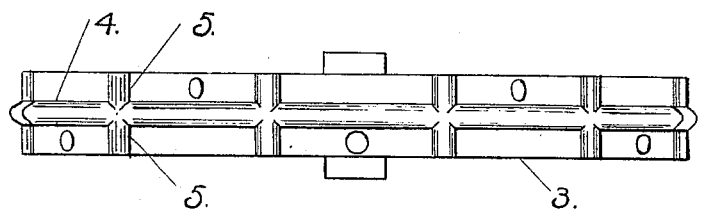
Fig. 2.
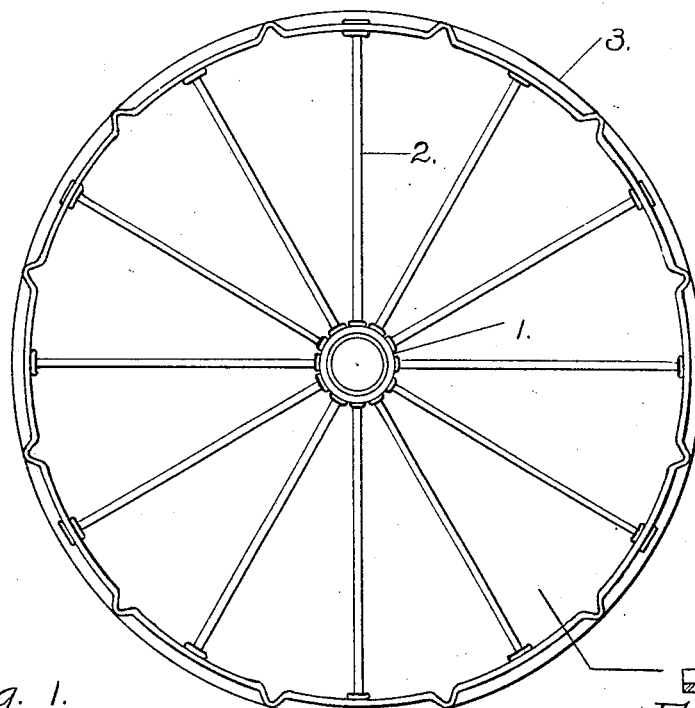
Fig. 1.
Fig. 3.
INVENTOR.
BY
ATTORNEY.

Patented Nov. 6, 1923.

1,472,856

UNITED STATES PATENT OFFICE.

JOHN P. SEAHOLM, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

VEHICLE WHEEL.

Application filed August 13, 1921. Serial No. 491,950.

*To all whom it may concern:*

Be it known that I, JOHN P. SEAHOLM, a citizen of the United States, residing at Moline, county of Rock Island, State of Illinois, have invented certain new and useful Improvements in Vehicle Wheels, of which the following is a specification.

The invention relates to wheels and methods of making the same.

Various methods have been employed to produce different kinds of wheels used with agricultural implements. In some cases, the wheels are cast, as for example, wheels for a mower; in other cases they are built with rims which are devoid of lugs, as for example, wheels for cultivators, and in other cases, they are built and have lugs attached, as for example, wheels for powerlift plows. Cast wheels are rather heavy and cumbersome; wheels without lugs are not desirable for all purposes; and wheels with lugs attached are relatively expensive. The present invention has been devised for the purpose of producing a wheel of more universal application, and one, which can be inexpensively produced, but at the same time, one that possesses the advantages desirable in a wheel of this kind.

The general object of the invention is to produce an improved vehicle wheel, particularly, a wheel for use with agricultural implements.

Other objects of the invention will appear from the specification and drawings.

An embodiment of the invention is illustrated in the accompanying drawings in which—

Figure 1 is a side view of a wheel embodying the invention.

Figure 2 is a top plan view.

Figure 3 is a section through the wheel rim.

A wheel is provided with a hub 1 of any suitable construction to which are attached a plurality of spokes 2, which are usually iron rods of suitable length that are fastened to the hub by means of a machine which is especially designed for that purpose. These spokes are in turn fastened to the rim 3 by being riveted or otherwise fastened thereto.

The rim of a wheel is the part to which the lugs or special treads are attached. When the wheel is cast, these lugs may be placed in various positions, but it is highly desirable to get away from cast wheels because of their weight and expense. When lugs are fastened to the rim of such a wheel, they not only increase the expense of the wheel, but unless they are of special design, they do not form a continuous tread, that is, when the wheel is used on a level surface, as for example, on a hard road, the wheel jogs from one lug to another instead of running on a continuous surface.

In the present invention the rim of the wheel is formed out of sheet metal which is pressed or rolled so as to be provided with a continuous bead or raised portion 4 forming a continuous center tread and a plurality of cross beads or lugs 5 which serve to act as gripping lugs when the wheel is running over soft ground. These raised portions are pressed in the metal prior to fastening the spokes thereto and while they may be located as desired and be of various shapes, they should be so formed as to provide a continuous tread equivalent to the continuous bead 4 while at the same time providing gripping lugs which will act when the wheel runs in soft ground.

In the construction shown the bead 4, not only acts as a continuous tread, but it also serves to brace and strengthen the rim according to well-known principles, that is, a curved or circular bar cannot be bent as easily as a flat piece of metal. The spokes can be fastened to the rim at juncture of the longitudinal and the crosswise beads where great strength is desired.

One of the advantages of this construction is that it may be inexpensively produced. The rim may be pressed or rolled into shape in long strips which can be cut and bent to form rims for wheels of any suitable size. The operation consists in taking a sheet metal strip and passing it through dies or a rolling machine which forms the beads. The strip is then cut into lengths and bent, after which, it is attached to the spokes which have previously been fastened to the hub.

The completed wheel is light, strong and durable. It runs evenly over a hard surface such as a pavement, and at the same time, is provided with gripping lugs which act when the wheel is running over soft ground.

It will be understood that the present invention is for purposes of illustration only and that variations can be made in the construction without departing from the spirit and scope of the invention as defined in the appended claim.

I claim:

A wheel having a sheet metal rim provided with a continuous bead stamped on it to form a continuous tread to prevent bumping over hard roads, and a plurality of cross beads stamped in the rim at intervals to give a gripping action when the wheel is in soft ground.

In testimony whereof, I affix my signature.

JOHN P. SEAHOLM.